(12) United States Patent
Salhotra et al.

(10) Patent No.: US 8,050,249 B1
(45) Date of Patent: *Nov. 1, 2011

(54) METHODS FOR REDUCING CONTENTION AND/OR HANDLING CHANNEL ACCESS IN A NETWORK

(75) Inventors: Atul Salhotra, San Jose, CA (US); Ravi Narasimhan, Los Altos, CA (US); Rahul Kopikare, Livermore, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 12/879,943

(22) Filed: Sep. 10, 2010

Related U.S. Application Data

(62) Division of application No. 10/895,006, filed on Jul. 19, 2004, now Pat. No. 7,826,438.

(60) Provisional application No. 60/565,287, filed on Apr. 26, 2004.

(51) Int. Cl.
*H04J 3/24* (2006.01)

(52) U.S. Cl. ........ 370/349; 370/445; 370/448; 370/447; 370/465

(58) Field of Classification Search .................. 370/349, 370/445, 448, 447, 465
See application file for complete search history.

(56) References Cited

U.S. PATENT DOCUMENTS

| | | | |
|---|---|---|---|
| 5,132,966 A | | 7/1992 | Hayano et al. |
| 5,936,949 A | | 8/1999 | Pasternak et al. |
| 6,137,793 A | | 10/2000 | Gorman et al. |
| 6,501,764 B1 * | | 12/2002 | Fudatate et al. ............. 370/445 |
| 2003/0016770 A1 | | 1/2003 | Trans et al. |
| 2003/0086515 A1 | | 5/2003 | Trans et al. |
| 2003/0145095 A1 | | 7/2003 | Liu et al. |
| 2003/0177187 A1 | | 9/2003 | Levine et al. |
| 2005/0213554 A1 * | | 9/2005 | Ginzburg et al. ............. 370/349 |
| 2006/0092871 A1 * | | 5/2006 | Nishibayashi et al. ....... 370/328 |
| 2007/0091805 A1 * | | 4/2007 | Ramprashad et al. ..... 370/230.1 |

OTHER PUBLICATIONS

Javier del Prado and Patrick Wienert Philips; "IEEE 802.11e Performance Evaluation," doc.: IEEE 802.11-03/865r0; Nov. 2003; 45 pages; grouper.ieee.org/groups/802/11/Documents.

* cited by examiner

*Primary Examiner* — Ajit Patel
*Assistant Examiner* — Khai M Nguyen

(57) ABSTRACT

A first information block is transmitted from a first terminal, the first terminal retaining access to a channel until either i) the first information block is acknowledged by a second terminal, or ii) at least a first predetermined period of time following transmission of the first information block expires, whichever is shorter. It is determined whether the first information block is acknowledged within the first predetermined period of time. A second information block is transmitted from the first terminal in response to the first information block being acknowledged within the first predetermined period of time. When the first information block has a first type, the first information block is retransmitted in response to the first information block not being acknowledged within the first predetermined period of time. When the first information block has a second type, retransmitting the first information block is attempted after waiting a second predetermined period of time.

20 Claims, 7 Drawing Sheets

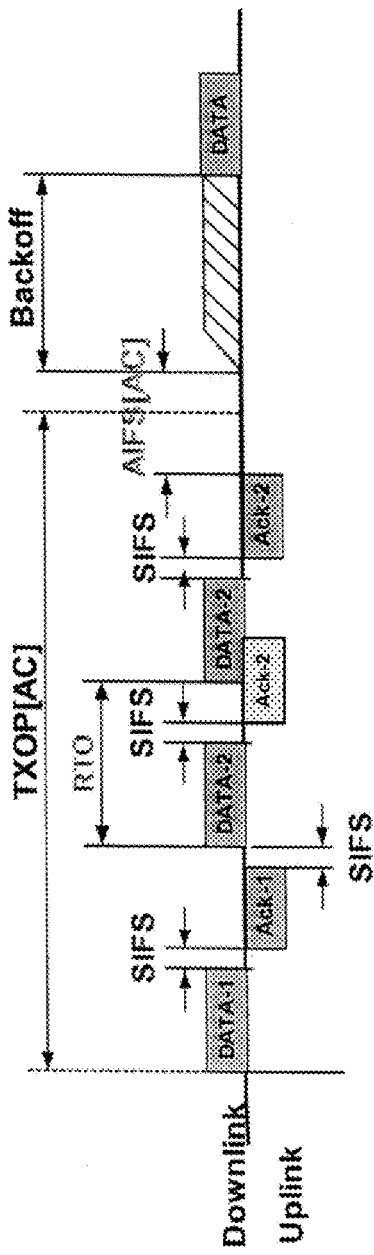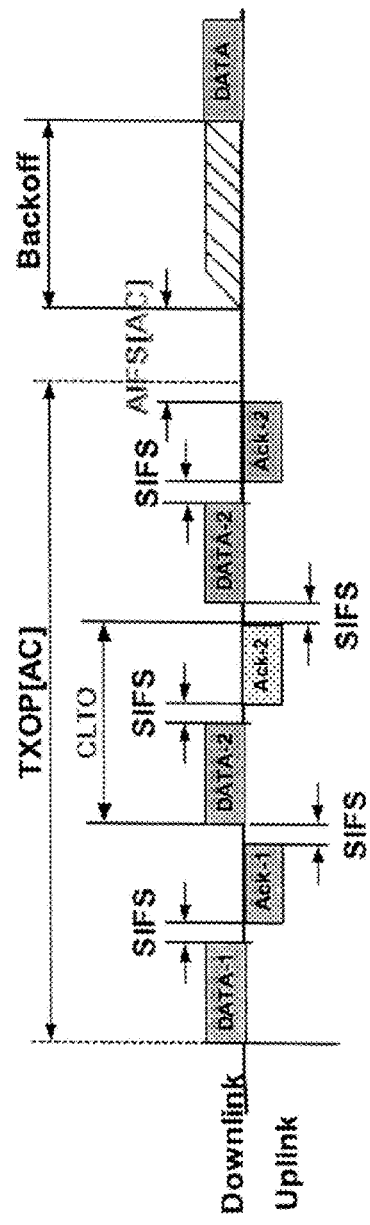

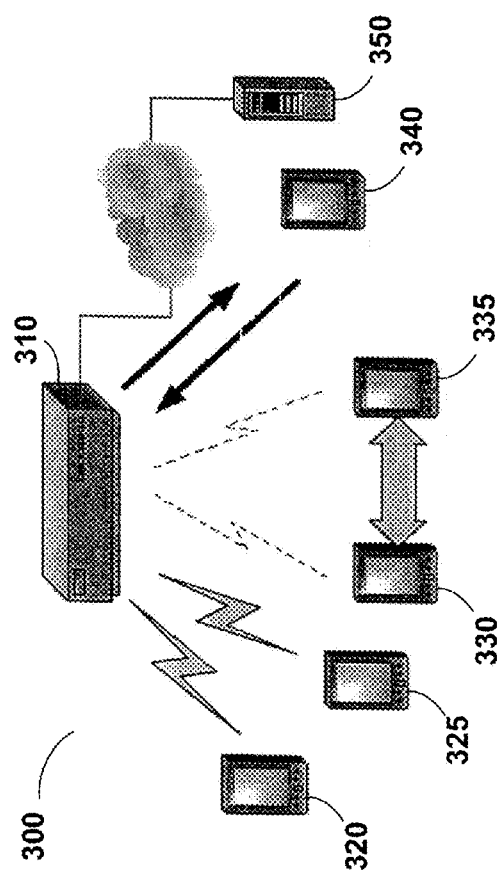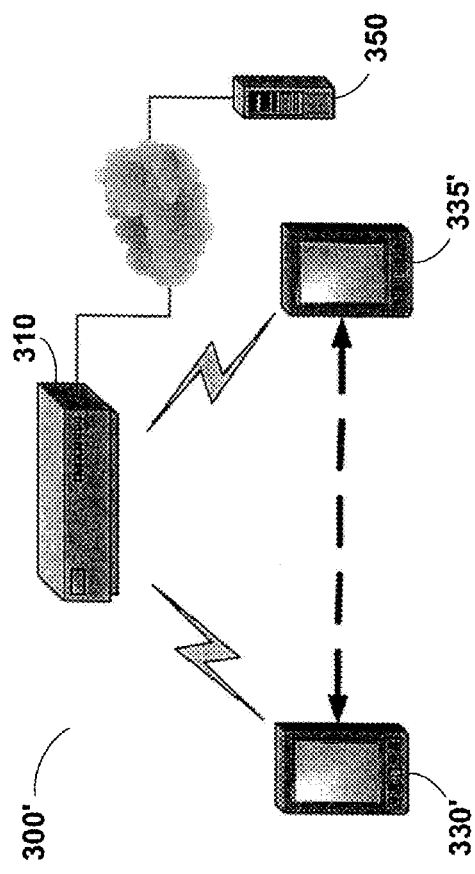

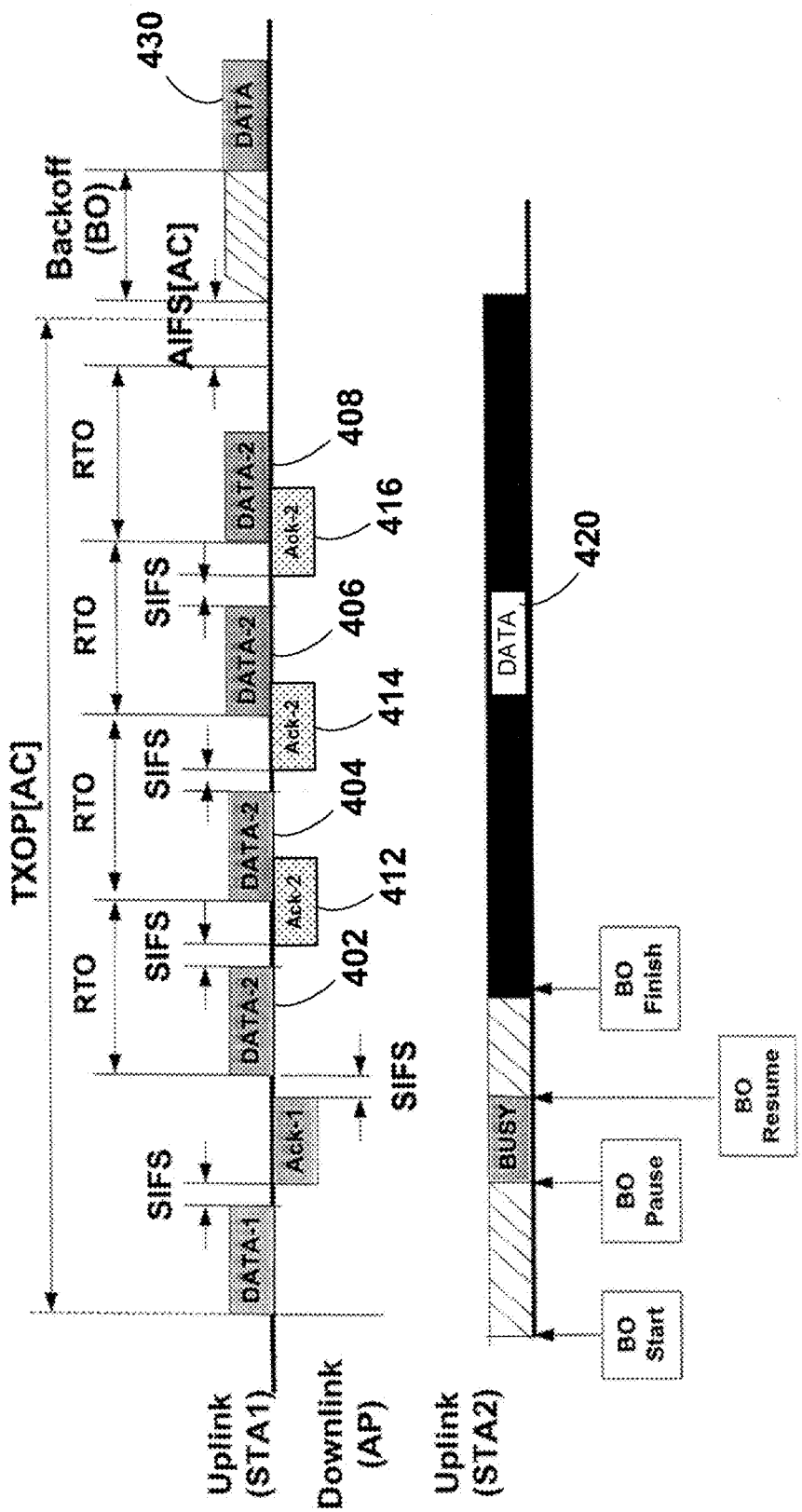

METHODS FOR REDUCING CONTENTION AND/OR HANDLING CHANNEL ACCESS IN A NETWORK

RELATED APPLICATION(S)

This application is a divisional of U.S. patent application Ser. No. 10/895,006, filed Jul. 19, 2004, now U.S. Pat. No. 7,826,438, incorporated herein by reference in its entirety, which claims the benefit of U.S. Provisional Patent Application No. 60/565,287, filed Apr. 26, 2004, incorporated herein by reference in its entirety.

FIELD OF THE INVENTION

The present invention generally relates to the field of managing contention and/or channel access in information and/or data transmissions in a network. More specifically, embodiments of the present invention pertain to methods, algorithms, software, circuits, architectures, and systems for reducing contention and/or handling channel access in data transmissions in a network.

DISCUSSION OF THE BACKGROUND

A standard (IEEE 802.11e) has been proposed for medium access control (MAC) quality of service (QoS) enhancements in wireless local area networks (LANs) and metropolitan area networks (MANs). The proposed standard is intended to enhance the 802.11 MAC to improve and manage QoS, expand support for applications with QoS requirements, provide classes of service, and consider efficiency enhancements in the area of the Distributed Coordination Function (DCF) and Point Coordination Function (PCF).

The proposed standard includes enhanced distributed channel access (EDCA), which defines the classes of service. FIG. 1 shows a block diagram of a conventional EDCA handler 10 within a wireless network station. EDCA handler 10 has four queues 12, 14, 16 and 18, corresponding to different access categories AC0, AC1, AC2 and AC3. Each access category ("AC") corresponds to a different class of service, and each class of service has a different priority for transmission over the network. Generally, these classes of service include, in order, "best effort" (or highest priority), video, voice, and background, which all refer to types of network "traffic" (i.e., data and/or information transmitted in, on or over a network). EDCA handler 10 generally further includes logic for identifying the class of service for a particular block of data or information (not shown).

Using arbitration control circuits 22, 24, 26 and 28, the queues 12, 14, 16 and 18 contend (or arbitrate) amongst themselves for the opportunity to access the channel to which EDCA handler 10 is coupled. Virtual Collision Handler (VCH) 30 determines which of queues 12, 14, 16 and 18 may contend for access to the channel based on a number of parameters, including arbitration interference spacing AIFS [n] and backoff period BO[n], each of which may be independent for each queue. Generally, the higher the priority, the shorter the arbitration interference spacing and/or backoff period for a given queue.

FIG. 2 shows a block diagram of a channel arbitration scheme 200, including a plurality of EDCA handlers 60, 62 and 64 arbitrating through medium access control (MAC) access handler 70 for control of channel 80. MAC access handler 70 uses a conventional arbitration protocol to determine which of EDCA handlers 60, 62 and 64 gains control of (and thus transmits over) channel 80. DCF refers to the process of arbitrating and/or contending for access to channel 80. Referring back to FIG. 1, selection of a queue 12, 14, 16 or 18 that will contend for access to channel 80 may be referred to as virtual DCF.

Enhanced DCF (EDCF) refers to an improved process for differentiating between classes of service based on (i) arbitration interference spacing and (ii) minimum and maximum contention windows (CWmin[n] and CWmax[n]). FIG. 3 shows an exemplary virtual EDCF scheme 100 for differentiating between different classes of service in a wireless network station. After a data packet 110 has been transmitted over the channel by a station that has been granted access to the channel, receipt of packet 110 is acknowledged by the receiving station over the channel using a conventional ACK signal. The ACK signal is typically sent after a period of time corresponding to the shortest possible interference spacing in the network, designated by "SIFS" in FIG. 3.

Referring back to FIGS. 1-2, access to the VCH 30 (and subsequently, access to the MAC access handler 70 and channel 80) is granted based on the class of service. Referring again to FIG. 3, blocks 130, 132 and 134 represent data having high, medium and low priority transmission categories, respectively. Each of blocks 130, 132 and 134 can access the VCH only after a predetermined period of time following the ACK signal. This predetermined period of time is the sum of the arbitration interference spacing, or AIFS, and the "backoff" (or wait) period. The AIFS and backoff period differ for each class of service (or transmission category, referred to as "TC" in FIG. 3, a term which is substantially equivalent to "access category" or "AC"), and each TC cannot begin to backoff until its AIFS has expired.

In the scheme of FIG. 3, the AIFS for each TC is determined according to the following formula:

$$AIFS[TC] = SIFS + (AIFSN[TC] * T_{slot}) \quad [1]$$

where SIFS is as defined above, $T_{slot}$ is the slot time, and AIFSN[TC] represents a fixed integer corresponding to the inverse order of priority (i.e., highest priority has the lowest AIFSN value). For the 802.11e specification, AIFSN has a minimum value of 2. PIFS, or PCF interframe spacing, is generally equal to (SIFS+$T_{slot}$). Generally, PIFS is shorter than DIFS but longer than SIFS. In PCF mode, PIFS is provided for Beacon packets to differentiate them (giving them higher priority) from the regular data packets that get transmitted at least after DIFS.

For example, in the scheme of FIG. 3, high priority TC 130 has an AIFSN value of 2, medium priority TC 132 has an AIFSN value of 3, and low priority TC 134 has an AIFSN value of 6. Thus, high priority TC 130 has the minimum AIFS, which is also known as the DIFS, or DCF interference spacing (also see, e.g., IEEE standard 802.11b). Contention window 140 is the period of time during which each TC must backoff, or wait, before any station may access the VCF/MAC access handler and transmit data over the channel (typically by transmitting a Request To Send [RTS] signal, then receiving a Clear To Send [CTS] signal from the receiving station). After each successful transmission, contention window 140 is reset to its minimum value, but if a transmission is unsuccessful, contention window 140 is incremented to its next successive value (up to its maximum value) until a transmission is successful.

Access is generally granted to the first TC to contend for access (e.g., transmit RTS). For a particular AC, the backoff period (after the applicable AIFS period) is calculated by selecting a random number from within the minimum contention window [0,CWmin[AC]] and multiplying that random number by $T_{slot}$. The window from which the random number is selected is inversely proportional to priority (i.e., the higher the TC priority, the smaller the window). Thus, since high priority TC 130 will generally be the first to contend for access to the channel (statistically speaking), generally it will be granted access when it is present. On a statistical basis, medium priority TC 132 generally will not contend for access to the channel until some number of time slots following high priority TC 130. Thus, medium priority TC 132 will generally be granted access only when there is no high priority TC 130 present to contend for access, although it is possible that, on occasion, the backoff period for medium priority TC 132 could be smaller than that of higher priority TC 130 because the number of time slots for a backoff period are picked randomly. Low priority TC 134 generally and/or statistically does not contend for access to the channel until some number of time slots following medium priority TC 132, so it will generally be granted access only when there is no high or medium priority block present to contend for access. In one implementation (an 802.11a PHY), SIFS is about 16 and $T_{slot}$ is about 9 µs. Thus, in that implementation, PIFS is typically about 25 µs, DIFS is typically about 34 µs, AIFS [medium priority TC] is typically about 43 µs, and AIFS[low priority TC] is typically about 70 µs.

To overcome potential contention problems from hidden nodes (see, e.g., the discussion below regarding hidden nodes), high priority TC 130 accesses the channel after transmitting an RTS signal to the intended receiver and receiving a CTS signal from the intended receiver. Terminals (nodes) in the "listening range" of the transmitter or receiver set their Network Allocation Vector (NAV) accordingly. However, the set of nodes that can hear the transmitter are not necessarily identical to the set of nodes that can hear the receiver. Those terminals that hear only the transmitter can be considered "hidden" from those terminals that hear only the receiver. Hence, the RTS/CTS handshake provides an extra protection mechanism in the case of hidden nodes.

Over time, proposals for EDCF have been made to the proposed 802.11e standard. It is generally believed that the ultimate standard, once approved, will include EDCF.

One such proposal is exemplified by the diagram in FIG. 4, which shows an EDCF scheme 150 that includes contention free bursting (CFB). In FIG. 4, "bursting" is exemplified by transmitting successive data packets 160, 162 and 164 from a particular access category in a station over a channel during a period of time designated as a transmission opportunity, or "TXOP." An AC may transmit as many packets as possible during TXOP; however, if there is insufficient time remaining in TXOP to transmit another data packet, the AC generally relinquishes control of the channel. The transmission of subsequent data packets follows the usual process; i.e., the terminal, before initiating the transmission, waits for a length of time corresponding to its interference spacing and backs off. Each AC is generally assigned a unique TXOP length; the higher the AC priority, the longer the TXOP. After each data packet 160, 162 and 164 is transmitted, an acknowledge signal Ack-1 170, Ack-2 172 and Ack-3 174 is respectively transmitted in response. In CFB, TXOP and the data packets 160, 162 and 164 are configured or designed such that multiple data packets can be transmitted during a single TXOP. The same station maintains control of and/or access to the channel, and no arbitration or contention is possible. As a result, the period of time between a given acknowledge signal and the next data packet transmission can be as short as SIFS. In one implementation, CFB improved the throughput of a wireless network to about 50 Mbps (from about 35 Mbps in an otherwise identical wireless network not employing CFB).

Furthermore, in the example of FIG. 4, after each ACK signal is received, the transmitting station checks the time remaining in TXOP and determines whether another data packet can be transmitted in the remaining time. If there is sufficient time, another packet is transmitted; if there is insufficient time, the station relinquishes control of the medium and contends again. Since there is no data transmission at the end of TXOP, no station has control of the channel, and the highest priority AC contending for access to the channel will be granted access a predetermined period of time following the final acknowledge signal 174. This predetermined period of time is generally AIFS[AC] plus a backoff period 180, where AIFS[AC] is the arbitration interference spacing for the AC contending for access, and the backoff period is as defined above.

However, there are conditions in IEEE 802.11e-compliant wireless networks where one may transmit a number of data packets under CFB, but not receive or detect an acknowledge signal. For example, in the case of hidden nodes, an ACK signal may collide with a data transmission (or other signal occupying the channel), causing the transmitting station not to receive the ACK. Also, during periods of relatively high noise in the channel (e.g., when the signal-to-noise ratio [SNR] is relatively low), both data and ACK transmissions may be difficult and/or impossible to receive and/or process correctly. Such problems may result in a packet transmission error, requiring a retransmission of the packet. High packet error rates (PERs) result in effective loss of throughput in the network, which can be catastrophic and/or fatal for high priority traffic, such as HDTV transmissions. At this time, the present inventors are unaware of any techniques for avoiding packet transmission errors in an IEEE 802.11e-compliant wireless network using CFB.

A need therefore exists to implement EDCF with contention free bursting, but without unnecessarily and/or inadvertently introducing sources of contention and/or failure. Such an implementation in wireless networks will help to keep up with ever-increasing demands for increased wireless network speeds, bandwidth, throughput and flexibility.

SUMMARY OF THE INVENTION

Embodiments of the present invention relate to methods, algorithms, software, circuitry and/or architectures for handling and/or managing contention and/or channel access in information and/or data transmissions in a system and/or network. In one aspect, the method generally comprises the steps of (1) transmitting a first information block from a first terminal over the network; and following transmission of the first information block, (2) transmitting a second information block from the first terminal over the network when the first information block is acknowledged within a first predetermined period of time, and waiting for a second predetermined period of time before attempting to retransmit the first information block from the first terminal when the first information block is not acknowledged within the first predetermined period of time. Alternatively, following transmission of the first information block, when the first information block is not acknowledged within the first predetermined period of time, the first information block is retransmitted from the first terminal over the network.

The circuitry and/or architectures generally comprise (a) a transmitter configured to transmit the information; (b) a detector configured to determine a priority state for the information; and (c) transmitter instruction logic configured to instruct the transmitter to (i) retransmit the information when the information has a first priority state, or (ii) wait for a second predetermined period of time before attempting to retransmit the information when the information has a second priority state, when the information is not acknowledged within a first predetermined period of time following transmission of the information. The systems and/or networks generally comprise those that include a circuit or architecture embodying one or more of the inventive concepts disclosed herein.

The present invention advantageously provides improved efficiency, reliability and/or performance in wireless (and particularly IEEE 802.11e-compatible and/or -compliant) networks. These and other advantages of the present invention will become readily apparent from the detailed description of preferred embodiments below.

BRIEF DESCRIPTION OF THE DRAWINGS

FIG. 7 is a timing diagram showing a first modified CFB implementation in a wireless network station according to the present invention.

FIG. 8 is a timing diagram showing a second modified CFB implementation in a wireless network station according to the present invention.

FIG. 10 is a diagram showing an exemplary wireless network on which embodiments of the present CFB process were simulated.

FIG. 11 is a diagram showing an exemplary wireless network having "hidden" nodes, for which various embodiments of the present invention are particularly advantageous.

FIG. 12 is a timing diagram showing a potential contention problem that is overcome by various embodiments of the present invention.

DETAILED DESCRIPTION OF THE PREFERRED EMBODIMENTS

Figure 2:
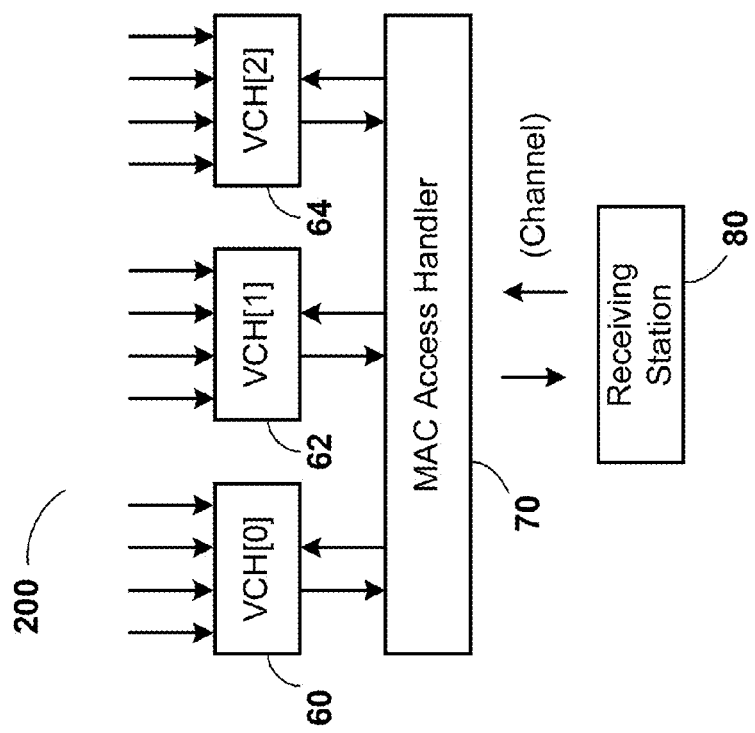
FIG. 2 is a block-level diagram showing a conventional architecture for managing arbitration between stations in a wireless network.
Figure 1:
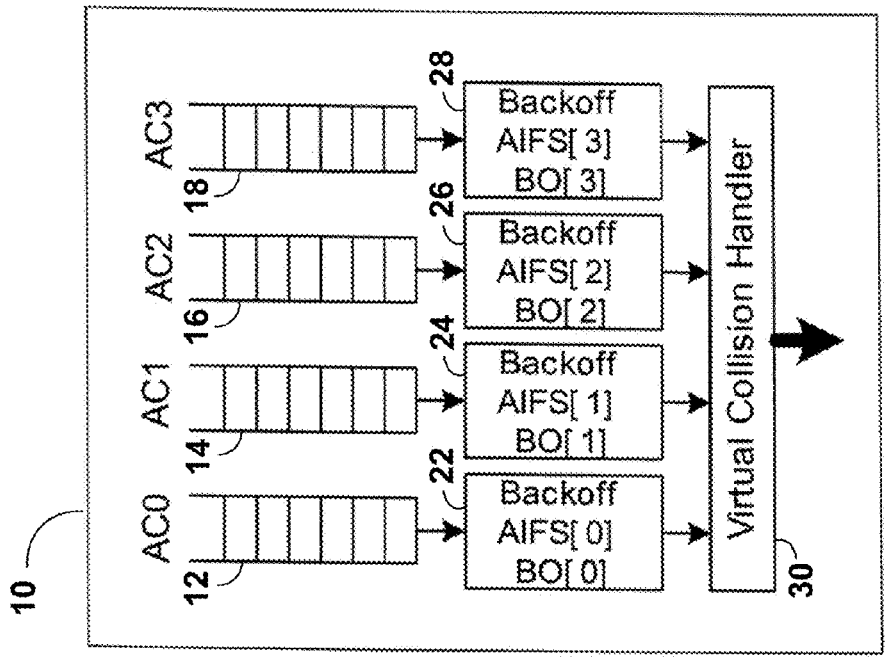
FIG. 1 is a block-level diagram showing a conventional scheme for managing different classes of service in a wireless network station.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of processes, procedures, logic blocks, functional blocks, processing, and other symbolic representations of operations on data bits, data streams or waveforms within a computer, processor, controller and/or memory. These descriptions and representations are generally used by those skilled in the data processing arts to effectively convey the substance of their work to others skilled in the art. A process, procedure, logic block, function, operation, etc., is herein, and is generally, considered to be a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and otherwise manipulated in a computer or data processing system. It has proven convenient at times, principally for reasons of common usage, to refer to these signals as bits, waves, waveforms, streams, values, elements, symbols, characters, terms, numbers, or the like.

It should be borne in mind, however, that all of these and similar terms are associated with the appropriate physical quantities and are merely convenient labels applied to these quantities. Unless specifically stated otherwise and/or as is apparent from the following discussions, it is appreciated that throughout the present application, discussions utilizing terms such as "processing," "operating," "computing," "calculating," "determining," "manipulating," "transforming," "displaying" or the like, refer to the action and processes of a computer or data processing system, or similar processing device (e.g., an electrical, optical, or quantum computing or processing device), that manipulates and transforms data represented as physical (e.g., electronic) quantities. The terms refer to actions, operations and/or processes of the processing devices that manipulate or transform physical quantities within the component(s) of a system or architecture (e.g., registers, memories, other such information storage, transmission or display devices, etc.) into other data similarly represented as physical quantities within other components of the same or a different system or architecture.

Furthermore, for the sake of convenience and simplicity, the terms "clock," "time," "rate," "period" and "frequency" are generally used interchangeably herein, but are generally given their art-recognized meanings Also, for convenience and simplicity, the terms "data," "data stream," "waveform" and "information" may be used interchangeably, as may the terms "connected to," "coupled with," "coupled to," and "in communication with," but these terms are also generally given their art-recognized meanings In the context of the network aspects of the present invention, a "terminal" generally refers to any physical device in a network configured to send or receive information, such as an access point, station, hub, controller, master, slave, or broadcast device.

The present invention concerns a circuit, architecture, system, method, algorithm and software for transmitting information over a network, particularly relating to handling or reducing contention, arbitrating, and/or managing or controlling channel access in such transmissions. The invention is particularly suited for use in wireless networks, especially IEEE 802.11e-compliant and/or -compatible networks.

In one aspect, the method generally comprises the steps of (1) transmitting a first information block from a first terminal over the network; and following transmission of the first information block, (2) transmitting a second information block from the first terminal over the network when the first information block is acknowledged within a first predetermined period of time, and waiting for a second predetermined period of time before attempting to retransmit the first information block from the first terminal when the first information block is not acknowledged within the first predetermined period of time. Alternatively, following transmission of the first information block, when the first information block is not acknowledged within the first predetermined period of time, the first information block is retransmitted from the first terminal over the network. The algorithm and/or software are generally configured to implement the present method and/or any process or sequence of steps embodying the inventive concepts described herein.

The circuit and/or architecture generally comprise (a) a transmitter configured to transmit the information; (b) a detector configured to determine a priority state for the information; and (c) transmitter instruction logic configured to instruct the transmitter to (i) retransmit the information when the information has a first priority state, or (ii) wait for a second predetermined period of time before attempting to retransmit the information when the information has a second priority state, when the information is not acknowledged within a first predetermined period of time following transmission of the information. The present invention further relates to an integrated circuit, a MAC access handler, a system and/or a network that contains the present circuit and/or architecture.

The invention, in its various aspects, will be explained in greater detail below with regard to exemplary embodiments.

Exemplary Methods for Reducing Contention and/or Handling Channel Access

In one aspect, the present invention relates to a method of transmitting information over a network, where the information comprises a plurality of information blocks. In one aspect, the method generally comprises the steps of (1) transmitting a first information block from a first terminal over the network; and following transmission of the first information block, (2) transmitting a second information block from the first terminal over the network when the first information block is acknowledged within a first predetermined period of time, and waiting for a second predetermined period of time before attempting to retransmit the first information block from the first terminal when the first information block is not acknowledged within the first predetermined period of time. Alternatively, following transmission of the first information block, when the first information block is not acknowledged within the first predetermined period of time, the first information block is retransmitted from the first terminal over the network.

An Exemplary "Normal" CFB Implementation

In one aspect, the present invention relates to a method of transmitting information over a network, the information comprising a plurality of information blocks, the method comprising the steps of (1) transmitting a first information block from a first terminal over the network; and following transmission of the first information block, (2) transmitting a second information block from the first terminal over the network when the first information block is acknowledged within a first predetermined period of time, and waiting for a second predetermined period of time before attempting to retransmit the first information block from the first terminal when the first information block is not acknowledged within the first predetermined period of time. This "transmit next packet or wait and contend" aspect of the invention may be referred to as a "normal" CFB transmission mode. This mode enables all terminals (and any VCH's and/or data/information queues therein) to arbitrate for access to a channel when there is an apparent problem with a data transmission and/or acknowledgement thereof, thereby (1) freeing up the network channel for a new transmission from the terminal, VCH, queue or access category having the highest priority, and/or (2) avoiding possible collisions between signals from a transmitting/receiving terminal pair and/or one or more new transmissions from one or more different terminals.

In various embodiments, the network comprises a wireless network and/or one that is compatible with one or more of IEEE Standards 802.11a, 802.11b, 802.11e, 802.11g and/or 802.11n (preferably one that is compatible with IEEE Standard 802.11e), and each of the plurality of information blocks comprises a data packet. The network may have one or more channels, over which the terminal(s) may transmit the information block(s).

In one embodiment, the network may allow for a control or indicator signal to inform terminals whether a particular channel is in use or not. As will be discussed in greater detail below, one may employ different periods of time for acknowledging receipt of an information block, depending on whether or not the indicator signal indicates that the channel is in use or is clear (i.e., not in use). Thus, the present method may further comprise the step of selecting (i) a first value for the first predetermined period of time when the channel is in use, or (ii) a second value for the first predetermined period of time when the channel is not in use. For example, when the channel is clear, terminals in the network may be configured to contend for control of the channel at the earliest possible time. However, when the channel is in use, terminals in the network may be configured to wait some predetermined minimum or maximum period of time (a "timeout" period) for an acknowledgement signal before they can contend for control of the channel. In this embodiment, the first predetermined period of time above (i.e., in which the transmitted information block is or is not acknowledged) is generally longer when the channel is in use, relative to when the channel is clear.

Figure 3:
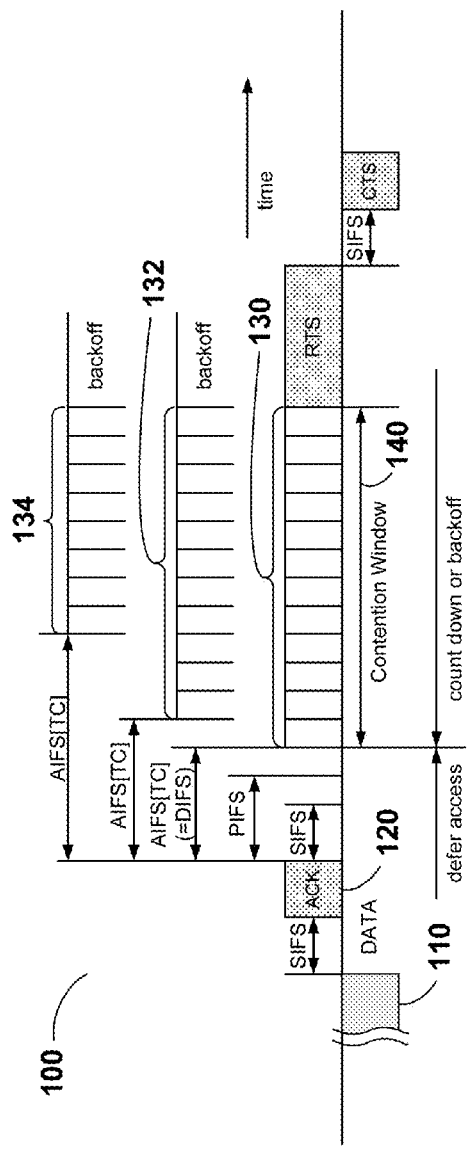
FIG. 3 is a timing diagram showing a conventional scheme for implementing EDCF in a wireless network station.
Figure 4:
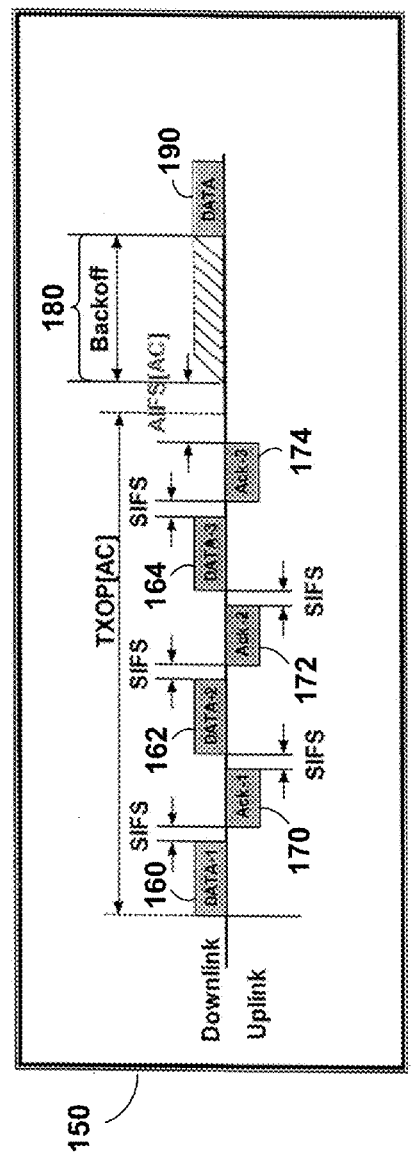
FIG. 4 is a timing diagram showing a conventional scheme for implementing CFB in a wireless network station employing EDCF.
Figure 5:
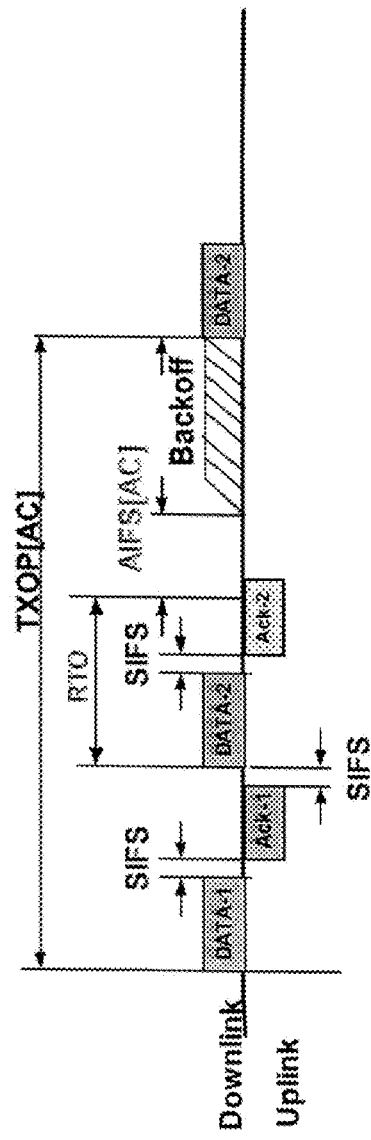
FIG. 5 is a timing diagram showing a first scheme for implementing "normal" CFB in a wireless network station according to the present invention.
Figure 6:
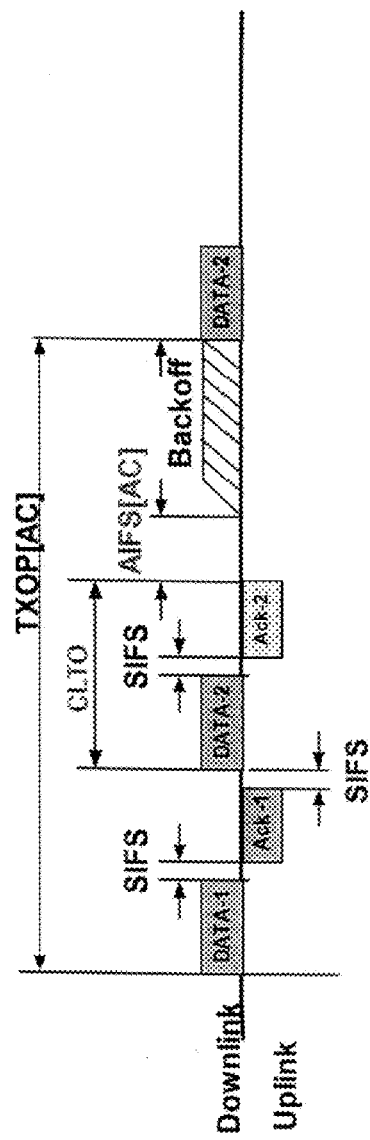
FIG. 6 is a timing diagram showing a second scheme for implementing "normal" CFB in a wireless network station according to the present invention.

FIGS. 5-6 show a first example of an information transmission process employing "normal" CFB. A first terminal (not shown) transmits or "downlinks" information comprising data packets DATA-1 and DATA-2 during a transmission opportunity window TXOP[AC] over a channel to a receiving terminal (not shown). The receiving terminal acknowledges receipt of DATA-1 by transmitting or "uplinking" an acknowledgement signal Ack-1 over the channel to the first terminal. Similar to FIG. 3, a minimum period of time (in this case, the shortest possible interference spacing, or SIFS) elapses between data transmissions and acknowledgements, generally to prevent collisions therebetween. However, due to some problem, the receiving terminal fails to acknowledge receipt of DATA-2 by transmitting acknowledgement signal Ack-2. The present method for contention-free bursting is intended, at least in part, to address this problem.

In the example of FIG. 5, the channel use indicator signal indicates that the channel is clear. In one implementation, a clear channel assessment (or CCA) signal may have a binary LOW or digital "zero" state to indicate that the channel is clear, or not in use. This is often the situation when the receiver does not transmit an acknowledgement, thereby indicating a reasonable likelihood that the packet transmission was corrupted or otherwise adversely affected by a "bad" channel (in which case the packet typically either is not received or is received with a sufficient number of errors to render error correction impossible within the allowed time frame). As shown in FIG. 5, when an acknowledgement (e.g., Ack-2) is not received within a predetermined period of time (in this case, RTO or "recovery time out"), the transmitting station previously having access to the channel ("AC") relinquishes its access to the medium. The station now waits for a minimum predetermined period of time (in this case, AIFS [AC] or the arbitration interference spacing period for the information type or quality that had just been transmitted over the channel) before backing off and contending again for control of the channel.

In the example of FIG. 5, the period of time RTO generally satisfies the following equation [2]:

$$SIFS < RTO - T_{data} < SIFS + (2*T_{slot}) \quad [2]$$

where SIFS and $T_{slot}$ are as defined above, and $T_{data}$ is transmission time for a data packet or other information block. Thus, according to one embodiment of the present method, the first value for the first predetermined period of time comprises a length of the first information block and a minimum interference spacing (e.g., when measuring from the start of the first information block transmission). Alternatively, when measuring from the end of the first information block transmission, the first predetermined time period value simply comprises the minimum interference spacing. In a further embodiment, the first value for the first predetermined period of time has a maximum length of the first information block length and an arbitration interference spacing (which, in the implementation shown in FIG. 5, is the minimum arbitration interference spacing).

Referring now to FIG. 6, the receiving channel sends Ack-2, and thus, the channel use indicator signal (e.g., the clear channel assessment or CCA signal) indicates that the channel is in use. In one implementation, CCA may have a binary HIGH or digital "one" state to indicate that the channel is in use. However, due to a problem in the channel or a collision with a transmission from a hidden node, for example, Ack-2 is not received by the transmitting terminal. When the acknowledgement is not received within a predetermined period of time (in the case shown in FIG. 6, CLTO or "CCA low time out"), the transmitting station previously having access to the channel ("AC") releases the medium (channel) and waits for a minimum predetermined period of time (in this example, AIFS[AC]) before backing off and contending again for control of the channel. Typically, when the acknowledgement signal is not received before the channel use indicator signal switches states to indicate that the channel is no longer in use, one has a reasonably clear indication that something is wrong with that channel. In this case, the first predetermined period of time (for which the transmitting terminal waits for acknowledgement) comprises (CLTO-$T_{data}$), or (SIFS+$T_{ack}$), where $T_{ack}$ is a predetermined length of time for transmission and/or receipt of an acknowledgement signal (an "acknowledgement length"). Thus, in one embodiment of the present method involving CFB, the second value for the first predetermined period of time comprises a length of the first information block, a minimum interference spacing, and an acknowledgement length (e.g., when measuring from the start of the first information block transmission). Alternatively, when measuring from the end of the first information block transmission, the second predetermined time period value comprises the minimum interference spacing (or an arbitration interference spacing) and the acknowledgement length.

An Exemplary Modified CFB Implementation

In a further aspect, the present invention relates to a method of transmitting information over a network, the information comprising a plurality of information blocks, the method comprising the steps of (a) transmitting a first information block from a first terminal over the network; and following transmission of the first information block, (b) transmitting a second information block from the first terminal over the network when the first information block is acknowledged within a first predetermined period of time, and retransmitting the first information block from the first terminal over the network when the first information block is not acknowledged within the first predetermined period of time. This "transmit next packet or retransmit first packet" aspect of the invention may be referred to as a "modified" CFB transmission mode. This mode enables a transmitting terminal, VCH and/or access category to retain control of a channel at a times when failure to receive acknowledgement cannot be due to collisions with data transmissions from other sources, thereby maximizing the data transmission efficiency of the transmitting terminal, VCH and/or access category during its transmission opportunity period. Thus, the information (or blocks thereof) may have an access category, and in one implementation of the "transmit next packet or retransmit first packet" aspect of the invention, the access category corresponds to at least a voice and/or video access category (e.g., high priority voice and high priority video traffic as described above).

As for the method of "normal" CFB transmissions described above, the network may comprise a wireless network having one or more channels therein, and the method and/or network may be compatible with one or more of IEEE Standards 802.11a, 802.11b, 802.11e, 802.11g and/or 802.11n (preferably with IEEE Standard 802.11e). Thus, each of the plurality of information blocks may comprise a data packet. Also as for the method of "normal" CFB transmissions described above, the predetermined period of time for acknowledgements may depend on an indication as to whether the channel is clear or in use. Thus, the method may further comprise selecting (i) a first value for the first predetermined period of time when the channel is in use, or (ii) a second value for the first predetermined period of time when the channel is not in use. In various embodiments, the first value for the first predetermined period of time comprises a minimum interference spacing and may further comprise a length of the first information block, and may have a maximum length of the first information block length and an arbitration interference spacing, similar to the method of "normal" CFB transmissions described above. Also, the second value for the first predetermined period of time may comprises a minimum interference spacing (or alternatively, an arbitration interference spacing) and an acknowledgement length, and may further comprise a length of the first information block, as described above.

FIGS. 7-8 show an example of the present information transmission process employing "modified" CFB. As for "normal" CFB, a first terminal (not shown) transmits or "downlinks" information comprising data packets DATA-1 and DATA-2 over a channel to a receiving terminal (not shown) during a transmission opportunity window TXOP [AC]. The receiving terminal acknowledges receipt of DATA-1 by transmitting or "uplinking" an acknowledgement signal Ack-1 over the channel to the first terminal. Similar to FIGS. 5-6, a minimum period of time (in this case, SIFS) elapses between data transmissions and acknowledgements.

Most first packet acknowledgement failures (e.g., failures to detect Ack-1) are due to (1) collisions between the first packet and another data packet from another terminal, (2) a second terminal, VCH and/or queue/AC trying to access the same network channel as the terminal, VCH and/or queue/AC corresponding to the first packet at substantially the same time, and/or (3) bad channel conditions corrupting or otherwise adversely affecting the data packet.

Once the first packet is acknowledged, that terminal, VCH and/or queue has control of the network channel, and subsequent acknowledgement failures will not be a result of collisions between subsequently transmitted data packets and data packets from other terminals. The present method for modified contention-free bursting is intended, at least in part, to take advantage of this situation. Thus, in the present method, step (a), transmitting a first information block from a first terminal over the network, may follow a previous information block transmission and acknowledgement.

In the example of FIG. 7, the channel use indicator signal indicates that the channel is clear. As shown in FIG. 7, when an acknowledgement (e.g., Ack-2) is not received within a predetermined period of time (in this case, RTO), the transmitting station previously having access to the channel immediately retransmits the non-acknowledged data packet DATA-2 after the predetermined period of time RTO expires. Of course, such retransmission may not occur immediately, but will generally occur as soon as possible after expiration of RTO. In this respect, and in order to further preclude the possibility of inadvertent collisions, the method may further include (i) calculating the remaining time left in the transmission period TXOP, (ii) comparing the calculated remaining transmission period time to an information block transmission time (e.g., $T_{data}$, as described above), (iii) retransmitting the second information block when the calculated remaining transmission period time is greater than the information block transmission time, and/or (iv) relinquishing the medium and contending again for the channel before attempting to access the channel when the information block transmission time is greater than the calculated remaining transmission period time.

In the example of FIG. 7, the retransmission or "downlinking" of DATA-2 is followed by successful receipt or "uplinking" of Ack-2, indicating that sufficient time remained in TXOP to retransmit DATA-2 and receive Ack-2. If insufficient time remains in TXOP to transmit an information block and receive acknowledgement, the transmitting terminal, VCH and/or queue generally releases control of the channel (e.g., the channel use indicator signal changes state), even if the transmitting terminal, VCH and/or queue has not transmitted all of its information blocks. The transmitting terminal, VCH and/or queue waits for a length of time corresponding to its arbitration interference spacing (AIFS), then backs off and contends again for control of the channel. In the example of FIG. 7, the transmission opportunity period TXOP expires during AIFS, which may give the transmitting terminal, VCH and/or queue a slight advantage over other terminals, VCH's and/or queues containing information of equal priority (which generally wait until the end of transmission period TXOP before waiting for their AIFS and backing off, then contending for access to the network channel). The transmission of generic data packet DATA following the backoff period indicates that the highest priority terminal, VCH and/or queue that was the first to contend for access gained access to the channel following arbitration.

Referring now to FIG. 8, essentially the same method as that of FIG. 7 is shown, but in which the channel use indicator signal indicates that the channel is in use. In this case, when the acknowledgement (e.g., Ack-2) is not received within a predetermined period of time (CLTO, similar to the case shown in FIG. 6), the transmitting station having access to the channel retransmits DATA-2 as soon as possible. However, because the channel use indicator signal indicates that the channel is in use when Ack-2 is sent (but not received), the indicator signal must time out (i.e., wait for CLTO to expire) before it can change state. Following a channel use indicator state change, there is a latency period in the transmitting station that must expire before it can transmit anything. In this case, that hardware latency is the shortest possible interference spacing (in this example, SIFS), but that latency is selected generally to minimize the time during which no information is transmitted over the channel (so-called "dead time") and to maximize transmission efficiencies. However, depending on design considerations and/or application choices, any minimum predetermined period of time can be selected.

In further embodiments, the method may further comprise counting a number of times the retransmitting step is performed. Generally, rather than continue to retransmit after a certain number of retransmission attempts fail, a subsequent corrective action can be taken that will improve the likelihood of a successful transmission, thereby increasing the channel transmission efficiency.

Even if one acknowledgement fails to be successfully received following its successful transmission, subsequent acknowledgements may fail for other reasons, such as data packet transmission failures and/or collisions with transmissions from hidden terminals. In such cases, one may not wish to continue blindly retransmitting the data packet (or other information block) for the remainder of the transmission opportunity period. Rather, upon a predetermined number of failed retransmissions, one may (i) retransmit the information block at a lower rate and/or (ii) wait for a third predetermined period of time before attempting again to retransmit the first information block.

It is generally known in the art that data transmissions at a relatively low rate have a higher likelihood of successful receipt and acknowledgement than do data transmissions at a relatively high rate if the first attempt (at the higher rate) failed due to channel errors. Typically, after a first failed acknowledgement, one may retransmit 1, 2 or 3 times before lowering the (re)transmission rate. Alternatively or additionally, after the retransmitting step is performed a predetermined number of times, one may wait for a third predetermined period of time before attempting again to retransmit the first information block. Waiting, in this context, generally causes the channel use indicator to change state and indicate that the channel is not in use, thereby enabling all terminals, VCH's and/or queues to contend for access to the network channel at the earliest possible time. Generally, when both corrective actions (i.e., lowering the (re)transmission rate and waiting before retransmitting again) are desired, one lowers the (re)transmission rate first (e.g., after 1 or 2 unsuccessful retransmissions), then waits (e.g., after 1 or 2 unsuccessful cycles of lowering the [re]transmission rate).

An Exemplary Multimode CFB Implementation

In one aspect, the present invention relates to a multimode CFB information transmission method that enables a high priority AC and/or queue (or, alternatively, a terminal transmitting high priority information) to retain control of a channel and retransmit data under certain conditions, while generally causing lower priority AC's, queues and/or information transmissions to "wait and contend." Similar to the present modified CFB method described above, conditions under which high priority information is retransmitted may include acknowledgement failures resulting from problems other than collisions with data transmissions from other sources (e.g., other terminals, VCH's and/or queues). This multimode approach enables high priority (or high speed) transmissions to have the greatest opportunity for success, while still allowing low priority (or low speed) transmissions to succeed and comply with the IEEE 802.11e standard. As will be explained in greater detail below, multimode CFB operation can make the difference between fully functional and partially non-functional high-speed terminals in a wireless network of intermediate complexity.

Thus, in this "multimode" aspect of the present method, the information (or blocks thereof) may have a type, in which case the method may further comprise determining the information type. For example, when said information has a first type (e.g., high priority), said first terminal may retain access to the channel during the first information block transmitting step, the first predetermined period of time (e.g., an interference spacing) and the retransmitting step. The first information type may also (or alternatively) correspond to a downstream direction (e.g., from access point to station), a low latency characteristic, or a relatively high transmission rate. Furthermore, in this aspect of the invention, when the information has a second type (e.g., low priority), the method may further comprise waiting for a second predetermined period of time before attempting to retransmit the first information block from the first terminal when the first information block is not acknowledged within the first predetermined period of time. The second information type may also (or alternatively) correspond to an upstream direction, a latency characteristic other than low latency, or a relatively low transmission rate.

The gist of the present multimode CFB transmission method lies in processing information of different types (or AC's of different priority levels) differently. In general, one may consider multimode CFB information transmission to be normal CFB with a special processing step (the retransmitting step of modified CFB) being conducted for, e.g., high priority information. Thus, in this aspect of the invention, the information has a priority, and the method further comprises determining the priority of the information. Priority may be correlated with the transmission rate (or "speed") with which the information is transmitted, but it may also be correlated to one or more other criteria, parameters or qualities of the information. For example, in IEEE 802.11e-compliant networks, priority may be correlated to access categories, classes of service, and/or quality of service (QoS).

Thus, in one embodiment, the information has a high priority or a low priority, and the method comprises the steps of: (a) transmitting a first information block from a first terminal over the network; and following transmission of the first information block, (b) (i) transmitting a second information block from the first terminal over the network when the first information block is acknowledged within a first predetermined period of time, and when the first information block is not acknowledged within the first predetermined period of time (ii) (1) retransmitting the first information block from the first terminal over the network when the first information block has a high priority, and (2) waiting for a second predetermined period of time before attempting to retransmit the first information block from the first terminal when the first information block has a low priority. In this embodiment, the first terminal may retain access to the transmission channel during the first information block transmitting step, the first predetermined period of time and the retransmitting step, up to an entire transmission period (which, as explained above and shown, e.g., in FIGS. 7-8, may encompass the first information block transmitting step, the first predetermined period of time and the retransmitting step).

As will be discussed in greater detail below with regard to FIG. 10, in most wireless networks, different access categories tend to have certain characteristic transmission rates and certain characteristic information flows and/or directionality, and thus, may be of different information types. For example, in the IEEE 802.11e standard, there are 4 defined ACs: voice (high priority), video (high priority), best effort (lower priority than voice and video), and background (lowest priority). The AIFSN values for these ACs are respectively 2, 2, 3 and 7. Low latency is important to QoS in voice and video-phone communications, although throughput is not of much concern since the bandwidth requirement for these ACs is relatively low. However, for other types of traffic, such as HDTV or standard TV, a relatively long latency is bearable as long as the jitter is reasonable (i.e., substantially all of the frames are delayed by a substantially equal extent; e.g., $\geq 98\%$ of the packets/frames have a latency within 20 or 30 msec of each other). Throughput, on the other hand, can be very critical to applications such as HDTV that require high bandwidth (e.g., in the range of from 10 to 100 Mb/sec, 12 to 50 Mb/sec, or 15 to 25 Mb/sec, such as a 19.2 Mb/sec rate associated with high-definition television [HDTV] information). Thus, voice and low-latency video traffic generally have the highest priority, whereas HDTV and standard TV are generally in the "best effort" access category. However, the flow of HDTV and standard TV information is almost exclusively one-way, from network information access point to TV terminal (except for acknowledgements and "background" information from the TV terminal to the access point).

Video information tends to have an intermediate rate (e.g., in the range of from 0.2 to <10 Mb/sec, 0.3 to 5 Mb/sec, or about 0.5 to 1 Mb/sec, such as a 0.5 Mb/sec rate associated with video telephone information), as does voice information (e.g., in the range of from 5 to <500 Kb/sec, 10 to <300 Kb/sec, or 50 to <200 Kb/sec, but which is less than the rate of video information, such as a 0.15 Mb/sec rate associated with voice over Internet Protocol [VoIP] information). However, voice traffic and certain types of video traffic (such as video phone and video conference information) tend to be bidirectional (i.e., with information flowing from wireless terminal to wireless access point and vice versa). Somewhat similarly, background information is transmitted bidirectionally, but generally at relatively low rates (e.g., from 0.1 to <100 Kb/sec, from 0.5 to <10 Kb/sec, or from about 1 to <5 Kb/sec, although background information can be transmitted at any rate as long as it is somehow identifiable [such as with a conventional tag, flag or other identifier] as background information). Thus, where throughput demands may be more challenging than latency, one may take different actions depending on the direction of the communication. In one such embodiment, "downstream" transmissions from an access point to a station generally use "modified" CFB, whereas "upstream" transmissions from a station to an access point generally use "normal" CFB. In one aspect of this embodiment, the terminal comprises an access point, and the method generally comprises retransmitting the first information block from the access point over the network when the first information block is not acknowledged within the first predetermined period of time (e.g., regardless of whether the information has a priority, or if it does, whether such priority is determined or identified). Alternatively or additionally, where the terminal comprises a station, the method may comprise waiting for a second predetermined period of time before attempting to retransmit the first information block from the first terminal when the first information block is not acknowledged within the first predetermined period of time (e.g., regardless of whether the information has a priority, or if it does, whether such priority is determined or identified).

In a further aspect, and similar to the present modified CFB transmission method described above, the present multimode CFB transmission method may further comprise counting the number of times the retransmitting step is performed. After a predetermined number of retransmissions (e.g., 1, 2 or 3), the method may further comprise (i) retransmitting the first information block at a lower rate, or (ii) waiting for the second predetermined period of time before attempting again to retransmit the first information block. Alternatively, the method may further comprise (i) retransmitting the first information block at a lower rate after a first predetermined number of retransmissions (e.g., 1 or 2), and (ii) waiting for the second predetermined period of time before attempting again to retransmit the first information block after a second predetermined number of retransmissions (e.g., 1 or 2).

Exemplary Software

The present invention also includes algorithms, computer program(s) and/or software, implementable and/or executable in a general purpose computer or workstation equipped with a conventional digital signal processor, configured to perform one or more steps of the method and/or one or more operations of the hardware. Thus, a further aspect of the invention relates to algorithms and/or software that implement the above method(s). For example, the invention may further relate to a computer program, computer-readable medium or waveform containing a set of instructions which, when executed by an appropriate signal processing device, is configured to perform the above-described method(s) and/or algorithm(s).

For example, the computer-readable medium may comprise any medium that can be read by a signal processing device configured to read the medium and execute code stored thereon or therein, such as a floppy disk, CD-ROM, magnetic tape or hard disk drive. Such code may comprise object code, source code and/or binary code.

The waveform is generally configured for transmission through an appropriate medium, such as copper wire, a conventional twisted pair wireline, a conventional network cable, a conventional optical data transmission cable, or even air or a vacuum (e.g., outer space) for wireless signal transmissions. The waveform and/or code for implementing the present method(s) are generally digital, and are generally configured for processing by a conventional digital data processor (e.g., a microprocessor, signal processor, network controller, media access controller, microcontroller or logic circuit such as a programmable gate array, programmable logic circuit/device or application-specific [integrated] circuit).

In one embodiment, the computer program and/or waveform comprises at least one instruction to specify, select, determine or choose (i) a first value for the first predetermined period of time when the channel is in use, and (ii) a second value for the first predetermined period of time when the channel is not in use, the first and second predetermined periods of time being different from each other. The first and second values for the predetermined "acknowledgement timeout" period may be preprogrammed into program-accessible memory, or they may be selected from a look-up table by configurable hardware configured to make such a selection in response to a channel use indicator signal (substantially as described above). Thus, as for the method(s) described above, as of the end of the transmission, the first value for the first predetermined period of time may comprise a minimum interference spacing, and may have a maximum length of an arbitration interference spacing. Also, the second value for the first predetermined period of time may comprise a minimum interference spacing and an acknowledgement length. Alternatively, the minimum interference spacing for the second value may comprise an arbitration interference spacing.

As for the present modified and multimode CFB transmission methods described above, the set of instructions may also further comprise at least one instruction adapted to (i) identify and/or determine the type (e.g., priority) of the information; (ii) count the number of transmissions or times a retransmitting step is performed; (iii) calculate a length of time remaining in a transmission period; and/or (iv) transmit the second information block when said calculated remaining length of time is greater than an information block transmission time. The type or priority may be determined by matching an identifier (e.g., a priority identifier) sent with the transmitted information to identification code correlated to a particular type (e.g., priority identification code stored in or programmed into memory accessible by the computer program that is correlated to a particular priority). After a predetermined number of retransmissions or retransmission attempts, the set of instructions may further comprise one or more instructions adapted to (1) retransmit the information (e.g., the first information block) at a lower rate and/or (2) waiting for the second predetermined period of time before attempting again to retransmit the information (e.g., the first information block). In embodiments that include instructions adapted to retransmit information that was not timely acknowledged, such instructions may be further adapted to retransmit the information when the calculated remaining length of time is greater than an information block transmission time, and optionally, wait until the remaining length of time expires before attempting to access the channel when the information block transmission time is greater than the remaining length of time.

Referring back to determining the type of information, the set of instructions may also further comprise at least one instruction for the first terminal to (i) retain access to the channel during the (re)transmitting step(s) and the first predetermined period of time (e.g., the interference spacing) when the information has a first type (e.g., corresponding to a high priority, a downstream direction, a low latency characteristic, or a relatively high transmission rate), and/or (ii) wait for a second predetermined period of time before attempting to retransmit the first information block when the information has a second type (e.g., corresponding to a low priority, an upstream direction, a latency characteristic other than low latency, or a relatively low transmission rate) and the first information block is not acknowledged within the first predetermined period of time. In the latter case (i.e., the second type of information), the set of instructions may further comprise at least one instruction for the first terminal to release or relinquish control of or access to the channel before attempting to retransmit the first information block.

Exemplary Circuits and/or Architectures

A further aspect of the invention relates to a circuit and/or architecture (hereinafter, "circuit"), comprising (a) a transmitter configured to transmit the information; (b) a detector configured to determine a type for the information; and (c) transmitter instruction logic configured to instruct the transmitter to (i) retransmit the information when the information has a first type, or (ii) wait for a second predetermined period of time before attempting to retransmit the information when the information has a second type and the information is not acknowledged within a first predetermined period of time following transmission of the information. In one embodiment, the information type refers or corresponds to a priority state. The first priority state corresponds to a high priority, and the second priority state corresponds to a low priority. Alternatively, the information type may comprise or correspond to a direction, a latency characteristic, or a transmission rate, in which case the first type may correspond to a downstream direction, a low latency, or a relatively high transmission rate, and the second type may correspond to an upstream direction, a latency characteristic other than a low latency, or a relatively low transmission rate. When the circuit is implemented in an IEEE 802.11e-compliant and/or -compatible wireless network, the information type may comprise or correspond to an access category, in which case the first type may correspond to a voice and/or video access category, and the second type may correspond to a best effort or background access category. The present circuit is generally configured to implement the present multimode CFB transmission method, although it is also able to implement either CFB mode (i.e., "normal" or modified) independently. Consistent with the present methods described above, the present circuit is particularly suited for use in a wireless network and/or a network compatible with one or more of IEEE Standards 802.11a, 802.11b, 802.11e, 802.11g and/or 802.11n, particularly an IEEE 802.11e-compliant and/or -compatible wireless network. Thus, the transmitter may comprise a wireless network transmitter that may further be compatible with IEEE Standard 802.11e.

In a further embodiment, the information comprises a plurality of information blocks, and following transmission of a first information block, the transmitter is configured to transmit a second information block when the first information block is acknowledged within the first predetermined period of time. Thus, the transmitter may retain access to a transmission channel during an information transmission period, the transmission period encompassing the first information block transmitting step, the first predetermined period of time and either the second information block transmitting step or the retransmitting step.

Figure 9:
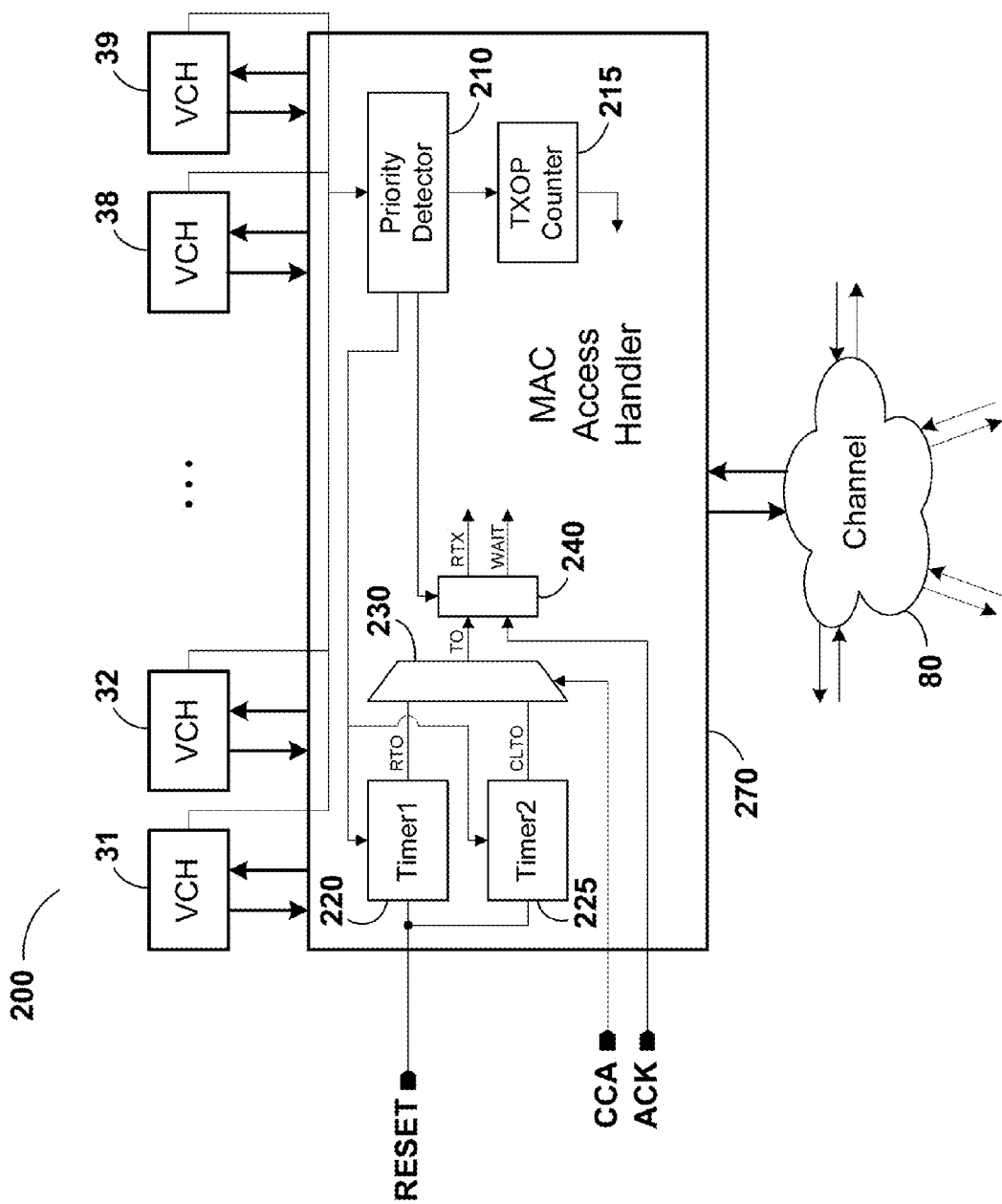
FIG. 9 is a block-level diagram showing a preferred embodiment of the present MAC access handler, configured to carry out CFB and modified CFB processes according to the present invention.

FIG. 9 shows a block-level architecture for an exemplary MAC access handler 200 that includes circuitry configured to implement single or multimode CFB transmissions in accordance with the present invention. Conventional circuitry within MAC access handler 200 (such as one or more buffers [e.g., for receiving information from each of the VCH's 31-39], the transmitter, an antenna, a receiver, a reference clock signal source such as a phase locked loop [PLL] or delay locked loop [DLL], configuration memory, etc.) has been omitted for purposes of clarity. The modified MAC access handler 200 generally comprises priority detector 210, transmission period counter 215, timers 220 and 225, timeout selector 230 and transmitter instruction logic 240.

At the highest level, MAC access handler 200 receives information (typically in the form of a serial data stream) from VCH's 31-39 and transmits the information over a channel 80 in a wireless network. While 4 VCH's are shown, the network may comprise any number of VCH's. Priority detector 210 receives an information priority indicator from each of VCH's 31-39 and indicates to transmission period counter 215, timers 220 and 225 and transmitter instruction logic 240 the priority of the information to be transmitted by MAC access handler 270. Alternatively, priority detector 210 can receive part or all of the information to be transmitted (e.g., a header section or sequence, a sufficient amount of the information to determine its rate and thus its priority, etc.), and identify the priority of the information using priority identifying logic. It is well within the abilities of one skilled in the art to design and use logic configured to detect and/or identify a particular sequence (e.g., that is correlated to or that identifies a particular priority) or determine a transmission rate, and output an appropriate instruction, identification or control signal in response to such detection, identification or determination.

Transmission period counter 215 simply measures the period of time for a given transmission opportunity (e.g., "TXOP") for a given information priority or access category, using conventional counter logic and/or circuitry, and outputs an appropriate signal when the transmission opportunity and/or period expires. MAC access handler 200 may further include a data packet opportunity calculator (which may be located in or adjacent to transmission period counter 215), configured to determine whether sufficient time remains in a transmission opportunity/period to transmit another data packet. It is well within the abilities of one skilled in the art to design and use counters, timers and/or logic configured to determine and/or calculate the time remaining in a particular time period, compare that remaining time to a reference time period (e.g., having a standard or predetermined length), and output an appropriate instruction, status or control signal in response to such detection, calculation and/or comparison.

The present transmitter instruction logic 240 may further comprise acknowledgement detection logic configured to (i) receive an acknowledgement signal (e.g., a conventional ACK and/or NAK signal) and/or timeout signal (e.g., TO), and/or (ii) determine whether the information is acknowledged within the first predetermined period of time. It is well within the abilities of one skilled in the art to design and use logic (e.g., one or more logic gates, such as a pass gate, three-statable buffer, OR gate, NOR gate, XOR gate, XNOR gate, NAND gate, etc., which may further comprise one or more inverters or buffers) configured to determine whether one signal is received (or changes state) before another signal is received (or changes state), and output an appropriate instruction or control signal in response to the relative timing of the two received signals. Transmitter instruction logic 240 (or alternatively, acknowledgement detection logic) may further comprise configured to (i) receive the timeout signal and an acknowledgement signal, and (ii) inform the transmitter instruction logic whether the information was acknowledged within the first predetermined period of time.

The timers 220 and 225 are generally configured to generate a timeout signal when the first predetermined period of time expires. However, consistent with the above explanation with regard to FIGS. 5-8, one timer (e.g., Timer1 220) may be configured to generate a first timeout signal corresponding to a first value for the first predetermined period of time when the channel is in use (e.g., RTO), and another timer (e.g., Timer2 225) may be configured to generate a second timeout signal corresponding to a second value for the first predetermined period of time when the channel is not in use (e.g., CLTO). Transmitter instruction logic 240 therefore may comprise at least one multiplexer 230 configured to select one of the first and second values for the timeout signal in response to a channel use control or indicator signal (e.g., CCA), and timers 220 and 225 may comprise configurable counters, in which the length of RTO and CLTO may depend on the AC class or priority. Timers 220 and 225 can be reset, e.g., by either a first bit or a last bit of a data packet or other information block transmission.

As is explained in greater detail above, the first and second predetermined periods of time are generally different from each other. For example, in one embodiment, the first value for the first predetermined period of time (e.g., RTO) comprises a length of the first information block and a minimum interference spacing, and may have a maximum length of the first information block length and an arbitration interference spacing. In an alternative or additional embodiment, the second value for the first predetermined period of time (e.g., CLTO) may comprise a length of the first information block, a minimum interference spacing (or alternatively, an arbitration interference spacing), and an acknowledgement length. Since arbitration interference spacing depends on the AC type or class, the length of the first predetermined period of time may depend on the particular AC type being transmitted. As a result, timers 220 and 225 may further receive an information (or AC) priority indicator from priority detector 210.

In various embodiments, MAC access handler 200 may further include (i) a counter configured to count a number of retransmissions of the information from the transmitter; (ii) transmission rate lowering logic configured to instruct the transmitter to retransmit the information at a lower rate in response to a first count signal from the counter indicating a first predetermined number of retransmissions; and/or (iii) wait instruction logic configured to instruct the transmitter to wait for the second predetermined period of time before attempting again to retransmit the information in response to a second count signal from the counter indicating a second predetermined number of retransmissions. In further embodiments, the present circuit and/or architecture is (i) embodied on a single integrated circuit and/or in a media access control device (which may, therefore, comprise the present circuit and/or architecture), and/or (ii) configured to convert serial data from the network to parallel data for a device, and/or convert parallel data from the device to serial data for the network.

An Exemplary Implementation

FIG. 10 shows an exemplary wireless, IEEE 802.11e-compliant network 300, comprising access point 310, HDTV terminals 320 and 325, video phone terminals 330 and 335, VoIP terminal 340, and network control device 350. Network control device 350 may comprise a general use computer (e.g., a PC), a network router, server, hub or switch, a base station, or other data processing and transferring device configured to communicate with access point 310 over a physical medium (e.g., copper wire, twisted pair cable, fiber optic cable, etc.). Use of the present invention in a network of intermediate complexity, such as network 300, can make the difference between a fully functional, compliant network and one that is at least partially nonfunctional.

Terminals 310-340 have the following data transmission and/or reception characteristics:

performance of latency-sensitive but low bandwidth streams (such as voice and video-phone) in the presence of high bandwidth flows like HDTV (where jitter can be as critical as frame loss), and vice versa.

Using only "normal" CFB under these simulation conditions, and with all flows in operation over for 25 seconds, it was found that low priority transmissions (video phone and VoIP) operated at full bandwidth (i.e., at 0.5 and 0.15 Mb/sec, respectively) and had no IFQ/MAC drops. However, high priority transmissions (HDTV) were did not operate at their target bandwidth and had a significant number of IFQ drops. For example, the flow from AP 310 to HDTV terminal 325 had an average throughput of 18.92 Mb/sec, and exhibited 414 IFQ drops over a 22½-second time frame. Worse yet, the flow from AP 310 to HDTV terminal 320 had an average throughput of 18.27 Mb/sec, and exhibited 1452 IFQ drops over a 23-second time frame. The total bandwidth for these high priority transmissions is insufficient for their requirements, and it is expected that HDTV displays based on such transmissions would be erratic and/or sketchy at best, and non-functional at worst.

Latency is also an issue in wireless network 300. As for bandwidth and packet drops, low priority transmissions did not have adverse latency issues. For example, >90% of all low priority transmissions had a latency of <10 msec, and except for transmissions from video phone 335 to video phone 330, >95% of all low priority transmissions had a latency of about 5 msec or less. In any case, substantially all low priority transmissions were completed within about 12 msec. However, about 20% of transmissions to HDTV terminal 325 had a latency of about 20 msec or more, and about 5% had a latency of about 30 msec or more. Worse yet, more than 50% of transmissions to HDTV terminal 320 had a latency of about 20 msec or more, and about 20% had a latency of about 30 msec or more.

(However, if network 300 only had one such high priority terminal, transmissions to that terminal would be expected to be fully functional. As a result, these simulations do not indicate that "normal" CFB according to the present invention is not useful by itself Certainly, as explained above, "normal" CFB has substantial utility as part of a multimode CFB method and/or protocol.)

Applying the present modified CFB method to the transmissions identified in wireless network 300 cured the high priority bandwidth, packet drop and latency issues. For example, under the same conditions described above for "normal" CFB alone, high priority transmissions (HDTV) oper-

| Flow | Type/Priority | Directionality | Packet Size | Rate/Speed |
|---|---|---|---|---|
| AP 310 → station 320 | HDTV/high | Unidirectional | 1500 bytes | 19.2 Mb/sec |
| AP 310 → station 325 | HDTV/high | Unidirectional | 1500 bytes | 19.2 Mb/sec |
| station 330 ↔ station 335 | Video phone/low | Bidirectional | 100 bytes | 0.5 Mb/sec |
| AP 310 ↔ station 340 | VoIP/low | Bidirectional | 512 bytes | 0.15 Mb/sec |

Data transmissions in network 300 were simulated using a conventional network simulator (e.g., Network Simulator or Network Simulator-2, available from the University of California at Berkeley at http://www-nrg.ee.lbl.gov/ns/ or http://www.isi.edu/nsnam/ns/, respectively), assuming a physical layer device data transmission rate of 108 Mb/sec and a packet error rate of 10%, a relatively high (but not unrealistic) error rate for wireless transmissions at these speeds. This particular simulation scenario was selected to predict the ated at their target bandwidth and had no IFQ or MAC drops. Furthermore, the latency of the high priority transmissions was essentially remarkably similar to that of the video phone transmissions. Ninety percent or more of all transmissions of all AC's (whether high or low priority) had a latency of about 6 msec or less, a remarkable improvement for high priority traffic over "normal" CFB alone. Employing modified CFB had no adverse impact on latency-sensitive traffic streams such as VoIP.

Exemplary Systems and Networks

In a further aspect of the invention, the system or network comprises the present circuit, integrated circuit or MAC access handler, at least one access point and at least one station. In the context of the system/network aspects of the present invention, an "access point" is a device providing external access to the system or network; e.g., the access point receives information from devices external to the network over a medium external to the system or network, and is able to transmit such external information internally to terminals in the system or network. Stations in the system or network generally can only be accessed by a network internally; if the terminal can also be accessed externally by another network, it can be considered to be an access point. However, stations can receive information from external sources directly or over a dedicated medium (i.e., from a storage medium such as a flash card or disk drive, or from remote control device or handheld computer transmitting a dedicated infrared optical signal, rather than through another network).

Typically, the system or network comprises only one access point, but a plurality of stations. Each of the access point(s) and station(s) are generally configured to interface (i.e., coupled in a manner enabling uni- or bidirectional communications) with the present circuit, integrated circuit or MAC access handler. In certain embodiments, the present circuit, integrated circuit or MAC access handler is located within the access point. In this embodiment, the information type is a direction (e.g., downstream [from access point to station] or upstream [from station to access point]), the first type corresponds to a downstream direction and the second type corresponds to an upstream direction. In further embodiments, at least one (or two) stations in the system or network each comprise a station receiving high priority information transmissions, such as a HDTV terminal. While the present invention enjoys particular advantage in wireless (preferably IEEE 802.11e-compliant) networks, the network may be any kind of known network, such as a storage network (e.g., RAID array), Ethernet, or home network, and the present network may comply or be compatible with one or more of IEEE Standards 802.11a, 802.11b, 802.11e, 802.11g and/or 802.11n.

An Exemplary Network with "Hidden" Nodes or Terminals

In some networks, certain stations may be "hidden" from each other, in that a first station may not be able to detect or recognize that a second station is transmitting information, and that first station may try to transmit information over the same channel during the second stations' transmission(s). The farther two stations are from each other, the smaller the received power is, and the more easily the received power can be confused with noise. When two stations are unable to detect transmissions over the medium from each other having any significant power (e.g., in a wireless medium, unable to detect the presence of a signal in the air from the other station), the nodes are hidden to each other. FIG. 11 shows an exemplary network 300', including access point 310, video phone terminals 330' and 335', and network control device 350. Access point 310 and network control device 350 are essentially the same as in the network 300 of FIG. 10. The primary functional difference between the video phone terminals 330' and 335' of FIG. 11 and the video phone terminals 330 and 335 in the network 300 of FIG. 10 is in the information flow. The video phone terminals 330' and 335' in the network 300' of FIG. 11 communicate bidirectionally with AP 310, whereas in FIG. 10, video phone terminals 330 and 335 communicate bidirectionally with each other. In the arrangement of FIG. 11, "hidden" video phone terminals 330' and 335' can transmit during the same transmission opportunity, thereby causing collisions and potentially reducing the efficiency of network 300'.

FIG. 12 shows an example of such collisions between transmissions from hidden stations, and how the various implementations of the present invention can reduce or eliminate network inefficiencies that may result from such collisions. A first hidden station (STA1) transmits a first data packet DATA-1 to an access point AP (e.g., access point 310 in FIGS. 10-11) at the beginning of a transmission period TXOP[AC]. Referring back to FIG. 12, at about the same time, a second hidden station (STA2) begins a backoff period ("BO Start"). After STA1 completes the DATA-1 packet transmission (and following the minimum interference spacing period SIFS), AP acknowledges receipt of DATA-1 (i.e., by transmitting acknowledgement signal Ack-1). During the acknowledgement, STA2 recognizes that AP is busy (e.g., it receives a complementary signal BUSY from AP), and STA2 pauses its backoff counter during the acknowledgement time period ("BO Pause"), then resumes backoff counting as soon as the acknowledgement time period is over ("BO Resume"). Following another interference spacing period SIFS, STA1 transmits the next data packet DATA-2 402, but during the transmission of DATA-2 402, STA2's backoff period expires ("BO Finish"). STA2, being hidden and thus not knowing that STA1 is transmitting data, begins to transmit its data (i.e., DATA 420). As a result, when AP tries to acknowledge receipt of DATA-2 402 by transmitting acknowledgement signal Ack-2 412, Ack-2 412 collides with DATA 420 being transmitted by STA2, and STA1 does not receive acknowledgement from AP within predetermined period of time RTO.

As described above with regard to the present modified CFB method and/or protocol, STA1 immediately retransmits the data packet (i.e., DATA-2 404). However, data packet DATA-2 404 also collides with DATA 420 from STA2. As a result, AP does not send an acknowledgement signal (e.g., Ack-2 414). STA1, not receiving acknowledgement for its high priority packet DATA-2 404, immediately retransmits the packet (DATA-2 406) again. However, second retransmission DATA-2 406 also collides with DATA 420 from STA2, and as a result, AP does not send an acknowledgement signal (e.g., Ack-2 416). STA1 retransmits the packet a third time (i.e., DATA-2 408), but it also collides with DATA 420 from STA2, and as a result, AP does not acknowledge it, either. Thus, the "retransmit and collide" cycle repeats itself until the transmission period TXOP[AC] expires.

In this example, the network would be more efficient if STA1 operated in "normal" CFB mode (e.g., after a transmission without acknowledgement, release control of the channel, wait for a length of time corresponding to the appropriate interference spacing [e.g., AIFS], then backoff [i.e., wait, or take no action, during backoff period "BO"] and contend again for access to the channel). In network 300', STA1 and STA2 "uplink" information to AP, and the collisions between such "uplink" transmissions from hidden stations to access point can be avoided if (i) access point transmissions are operated in modified CFB mode, and (ii) station transmissions are operated in "normal" CFB mode, as is described above in paragraphs [0046]-[0047]. This solution has the added advantages of transmitting most high priority AC traffic (e.g., HDTV) in modified CFB mode, thereby maximizing the efficiency of the highest priority transmissions, and imposing a comparatively less efficient "normal" CFB mode predominantly on lower priority AC traffic, where it has essentially no adverse impact (as demonstrated by the simulation results described above).

Alternatively, as described above for one embodiment of the present modified CFB method and/or protocol, STA1 may include a counter that counts the number of retransmissions or retransmission attempts. In one implementation, the retransmission counter in STA1 is configured to instruct STA1 after a predetermined number of retransmissions or retransmission attempts (without acknowledgement) to wait for at least an interference spacing (e.g., AIFS[AC]), then backoff and contend again for access to the channel, similar to the protocol described above in paragraphs [0056]-[0058]. For example, if the predetermined number of retransmissions was 1 in FIG. 12, STA1 would have stopped transmitting after packet DATA-2 404 and would not have sent packet DATA-2 406, thereby avoiding the collisions that followed transmission (or its transmitter) to go to "normal" CFB mode, because an excessive number of transmission of packet DATA-2 404. In such a case, STA1 could have released control of the channel after expiration of (i) the second RTO and (ii) a subsequent interference spacing, thereby ending the transmission period TXOP[AC] early, and allowing or enabling STA2 (or another station in the network) to take control of the channel and transmit its information at an earlier time. As a result, some or most of the collisions between transmissions from hidden nodes or terminals can be avoided, and network efficiency can be improved.

In an alternative implementation, the retransmission counter in STA1 may be further configured to reduce the transmission rate of any retransmitted data packet after a first predetermined number of retransmissions or retransmission attempts (without acknowledgement), before instructing STA1 to wait and contend again (e.g., after a second predetermined number of retransmissions or retransmission attempts, typically greater than the first predetermined number). If the difference between the first and second predetermined retransmission numbers is 2 or more, the counter may instruct the transmitter to reduce its transmission rate for each subsequent retransmission, until a retransmission succeeds or the station releases control of the channel and waits (e.g., TXOP expires or the second predetermined number of retransmissions is reached).

For example, with reference to FIG. 12, after the first retransmission of DATA-2 404 is not acknowledged, the second retransmission DATA-2 406 is sent at a lower rate than were packets 402 and 404. Subsequently, after the second retransmission of DATA-2 406 is not acknowledged, the third retransmission DATA-2 408 may be sent at an even lower rate than second retransmission DATA-2 406. After the third retransmission DATA-2 408 is not acknowledged, STAT may release control of the channel before TXOP times out, in order to enable other stations (or the access point) to access the channel at an earlier time than they otherwise would have.

In this alternative, one may wish to limit the number of retransmissions where the transmission rate is reduced. For example, an excessive number of transmission rate reductions could result in a false rate adaptation. One generally reduces the transmission rate when acknowledgement failures are perceived to be a consequence of problems in the channel, for which a lower rate will generally increase the likelihood of transmission success. However, such as in the case of FIG. 12, acknowledgement failures due to collisions cannot be cured by lowering the transmission rate, so lowering the transmission rate in such a case is an example of "false rate adaptation." Further reductions in transmission rate (e.g., further false rate adaptations) could ultimately result in a packet drop, which typically is an unacceptable result in commercial applications. Consequently, it may be advantageous in this implementation to limit the number of retransmissions where the transmission rate is reduced.

CONCLUSION/SUMMARY

Thus, the present invention provides methods, algorithms, software, circuitry and/or architectures for handling and/or managing contention and/or channel access in information and/or data transmissions in a system and/or network. In one aspect, when the information is not acknowledged within a first period of time, the method may comprise waiting for a second period of time before attempting to retransmit the information. Alternatively, the information may be retransmitted from the transmitting terminal when the information is not acknowledged within the first period of time. Furthermore, the method may comprise both waiting and retransmitting, wherein the specific action that is taken depends on the priority of the information and/or source of the transmission. The circuit and/or architecture generally comprise (a) a transmitter, (b) an information priority state detector, and, when the information is not acknowledged within a first predetermined period of time following transmission of the information (c) logic configured to (i) retransmit the information when the information has a first priority state, or (ii) wait for a second predetermined period of time before attempting to retransmit the information when the information has a second priority state. The present invention advantageously provides improved efficiency, reliability and/or performance in wireless (and particularly IEEE 802.11e-compatible and/or -compliant) networks.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of transmitting information over a network, the information comprising a plurality of information blocks, the method comprising:
  transmitting a first information block from a first terminal over a channel in the network, the first terminal retaining access to the channel until either
    the first information block is acknowledged by a second terminal receiving the first information block, or
    at least a first predetermined period of time following transmission of the first information block expires, whichever is shorter;
  determining whether the first information block is acknowledged within the first predetermined period of time;
  transmitting a second information block from the first terminal over the network in response to the first information block being acknowledged within the first predetermined period of time; and
  in response to the first information block not being acknowledged within the first predetermined period of time, retransmitting the first information block when the first information block has a first type, and waiting for a second predetermined period of time before attempting to retransmit the first information block when the first information block has a second type.

2. The method of claim 1, wherein each of the plurality of information blocks comprises a data packet.

3. The method of claim 1, wherein the network comprises a wireless network.

4. The method of claim 3, wherein the network is compatible with IEEE Standard 802.11e.

5. The method of claim 4, wherein each of the first information block and the second information block has an access category.

6. The method of claim 5, wherein the access category corresponds to a voice access category and/or video access category.

7. The method of claim 1, wherein the method and/or network comply or are compatible with one or more of IEEE Standards 802.11a, 802.11b, 802.11e, 802.11g and/or 802.11n.

8. The method of claim 1, further comprising selecting (i) a first value for the first predetermined period of time when the channel is in use, and (ii) a second value for the first predetermined period of time when the channel is not in use, the first predetermined period being different from the second predetermined period of time.

9. The method of claim 8, wherein the first value for the first predetermined period of time comprises a minimum interference spacing.

10. The method of claim 9, wherein the first value for the first predetermined period of time has a maximum length of an arbitration interference spacing.

11. The method of claim 8, wherein the second value for the first predetermined period of time comprises a minimum interference spacing and an acknowledgement length.

12. The method of claim 1, further comprising calculating a length of time remaining in a transmission period.

13. The method of claim 12, wherein the retransmitting step comprises retransmitting the first information block when the calculated remaining length of time is greater than an information block transmission time, and wherein the method further comprises waiting until the remaining length of time expires before attempting to access the channel when the information block transmission time is greater than the remaining length of time.

14. The method of claim 1, wherein the first type corresponds to a high priority, a downstream direction, a low latency characteristic, or a relatively high transmission rate.

15. The method of claim 14, wherein the second type corresponds to a low priority, an upstream direction, a latency characteristic other than low latency, or a relatively low transmission rate.

16. The method of claim 1, wherein the first terminal releases or relinquishes control of or access to a channel in the network before attempting to retransmit the first information block.

17. The method of claim 1, further comprising counting a number of times the retransmitting step is performed.

18. The method of claim 17, further comprising waiting for a second predetermined period of time before attempting again to retransmit the first information block after the retransmitting step is performed a first predetermined number of times.

19. The method of claim 17, further comprising retransmitting the first information block at a lower rate after the retransmitting step is performed a second predetermined number of times.

20. The method of claim 1, further comprising:

transmitting a third information block from a first station over the network; and following transmission of the third information block, transmitting a fourth information block from the first station over the network in response to the third information block being acknowledged within a third predetermined period of time; and waiting for a fourth predetermined period of time before attempting to retransmit the third information block from the first station in response to the third information block not being acknowledged within the third predetermined period of time.

* * * * *